United States Patent
Silva

(10) Patent No.: US 7,575,820 B2
(45) Date of Patent: Aug. 18, 2009

(54) SYSTEM AND METHOD FOR CONTROLLING WRITE TO MINIMIZE ATI AND SQUEEZE EFFECTS

(75) Inventor: Joseph Silva, Hollister, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 886 days.

(21) Appl. No.: 10/801,270

(22) Filed: Mar. 16, 2004

(65) Prior Publication Data

US 2005/0207296 A1    Sep. 22, 2005

(51) Int. Cl.
*G11B 5/66* (2006.01)
(52) U.S. Cl. .............. 428/694 R; 360/46; 360/77; 360/97.1
(58) Field of Classification Search ............. 428/694 R; 360/46, 77, 97.01
See application file for complete search history.

(56) References Cited

U.S. PATENT DOCUMENTS

| | | | | |
|---|---|---|---|---|
| 4,149,200 A * | 4/1979 | Card | ................. | 360/77.08 |
| 5,227,212 A * | 7/1993 | Ahlert et al. | ............. | 360/97.01 |
| 5,600,500 A * | 2/1997 | Madsen et al. | ................ | 360/46 |
| 6,064,534 A * | 5/2000 | Simozato | .................... | 360/46 |
| 6,101,053 A * | 8/2000 | Takahashi | .................... | 360/46 |
| 6,384,599 B1 * | 5/2002 | Chan et al. | ................... | 324/212 |
| 7,095,577 B1 * | 8/2006 | Codilian et al. | ............... | 360/46 |
| 2002/0105748 A1 | 8/2002 | Lamberts | .................... | 360/69 |

* cited by examiner

*Primary Examiner*—Leszek Kiliman
(74) *Attorney, Agent, or Firm*—John L. Rogitz

(57) ABSTRACT

Values for baseline write current and/or kick amplitudes from the baseline are determined for each head for each disk sector it writes and stored in a table. The values are determined so as to achieve a desired overwrite level. During operation, the values are looked up and applied to the heads depending on the particular sector being written. The values may be dynamically varied for temperature deviations from a baseline value.

20 Claims, 1 Drawing Sheet

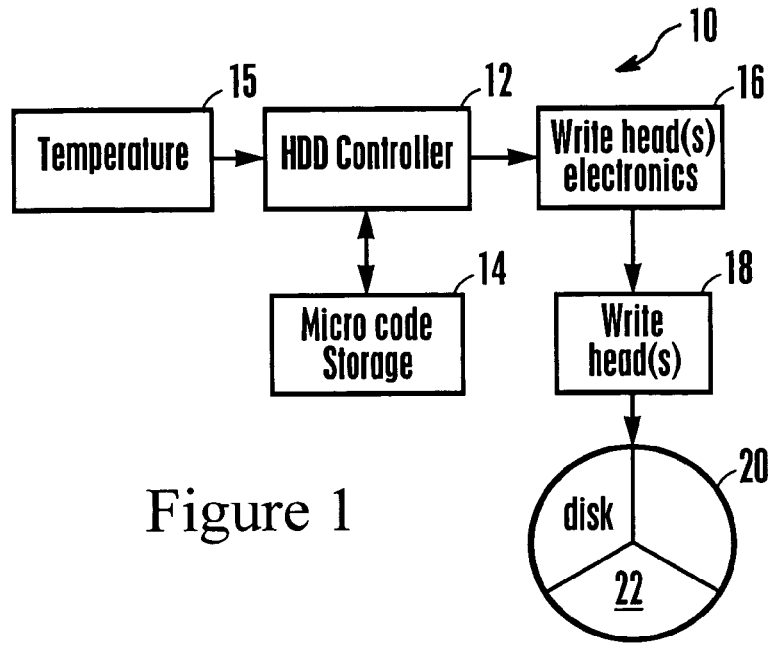
Figure 1
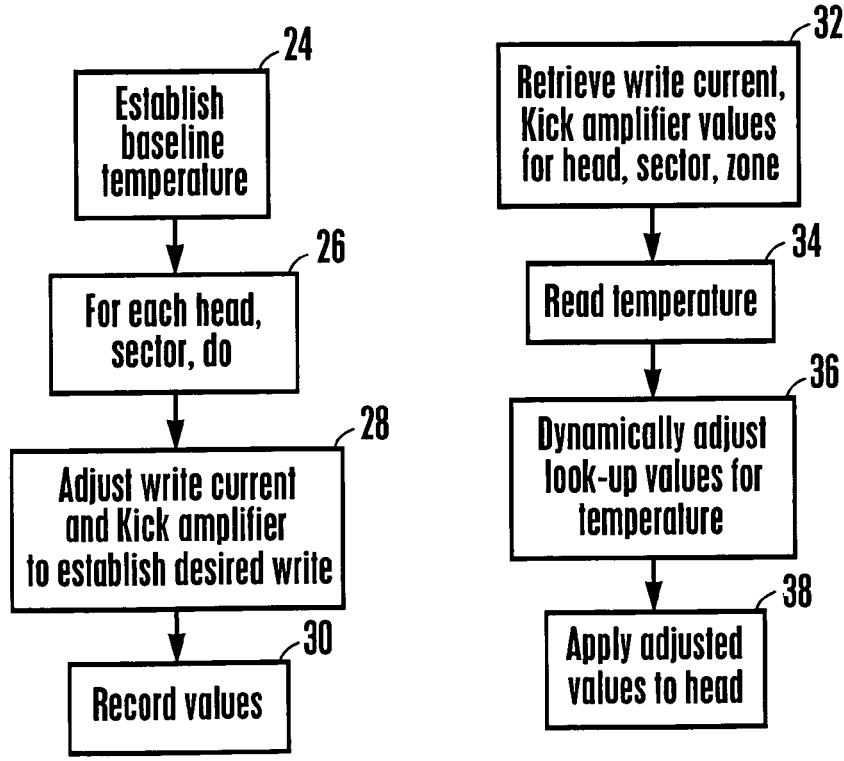
Figure 2
Figure 3

SYSTEM AND METHOD FOR CONTROLLING WRITE TO MINIMIZE ATI AND SQUEEZE EFFECTS

I. FIELD OF THE INVENTION

The present invention relates to hard disk drives.

II. BACKGROUND OF THE INVENTION

Write elements of hard disk drives (HDD) must write with sufficient current to overwrite old data that already exists in the data tracks to be written. The magnitude of a write element's overwriting is usually expressed in terms of negative decibels, with a larger absolute value representing more powerful overwriting and a smaller absolute value indicating less powerful overwriting.

As understood herein, it is not sufficient simply to maximize the write current sent to a write element, because too much write current can result in write flux spilling over onto adjacent tracks, potentially changing the data in those tracks. As further understood herein, this problem grows worse when laminated disk platters are used. In laminated disk platters, a film of material that can be magnetically written and read is adhered to a substrate. In such disks, the write element's recorded pattern may be relatively wide, so that if too much write current is applied, the flux can even more easily extend into adjacent tracks (referred to as "adjacent track interference") and also cause so-called "double-sided squeeze", wherein a track between two tracks being written is unintentionally exposed to write flux from the tracks that straddle it.

As critically recognized by the present invention, the proper amount of write current to be applied to a write element may vary from head to head in a HDD, and for any particular head, may vary from sector to sector in the HDD. With the above recognition in mind, the present invention has been provided.

SUMMARY OF THE INVENTION

A hard disk drive (HDD) includes a disk including plural portions, and a write element juxtaposed with the disk for writing data in the portions. A controller establishes a write current and/or a kick amplitude that is associated with the write element for each head for each disk portion to establish an overwrite signal-to-noise ratio within a desired range.

If desired, the controller may establish both a write current and a kick amplitude for each write element for each portion. The desired overwrite range may be approximately −22 db to −24 db.

In a non-limiting embodiment the controller accesses a table that correlates write current and kick amplitude to head/portion combinations. The controller may dynamically vary looked-up write currents and kick amplitudes as a function of sensed temperature.

In another aspect, a chip for a hard disk drive (HDD) having a disk defining plural portions and a write element for writing data to the disk includes means for accessing a table correlating write currents and/or kick amplitudes to head/portion combinations, and means for establishing, for at least one head/portion combination, at least one of: a write current, and a kick amplitude.

In still another aspect, a chip is disclosed for a HDD that has a head and a disk juxtaposed with the head and defining plural portions. The chip includes means for storing at least one value for each head for each disk portion which can be written by the head. The value represents at least one of: baseline write current, and kick amplitude. Means are provided for using the value to generate a write current useful by the head.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present hard disk drive (HDD);

FIG. 2 is a flow chart of the logic for generating the write current and kick amplitude tables for each head and sector; and FIG. 3 is a flow chart of the present operational logic.

DETAILED DESCRIPTION OF THE PREFERRED EMBODIMENT

Referring initially to FIG. 1, a hard disk drive (HDD) is shown, generally designated 10, which includes a hard disk drive controller 12 that can include and/or be implemented by a microcontroller. The controller 12 may access electronic data storage such as a microcode storage 14 that may be implemented by a solid state memory device. The microcode storage 14 can store microcode embodying the tables and operating logic discussed further below. Accordingly, in a non-limiting embodiment the present logic may be implemented by microcode that cannot be altered by a user once implemented in the HDD 10. Also, the HDD controller 12 can receive temperature signals from a temperature sensor 15.

The HDD controller 12 controls electronics 16 that are associated with one or more heads 18 for writing data onto one or more disks 20. Non-limiting implementations of the HDD 10 include plural heads and plural disks 20, and each head 18 is associated with a respective read element for, among other things, reading data on the disks 18 and a respective write element for writing data onto the disks 20.

As stated above, the logic disclosed below may be contained in a storage 14 that is separate from the HDD controller 12, or the storage 14 may be integrated into the controller 12. Or, it may be contained in the electronics 16, or on chipsets that are separate from the controller 12 and electronics 16. The logic may be distributed through the components mentioned above, and may be implemented in hardware logic circuits and/or software logic circuits.

The electronics 16 can include various head actuator components, including write element current preamplifiers, and can also establish data channels. The data channels in the electronics 16 can cooperate with the read and write elements on the heads 18 to establish a write current to the write elements, to establish a kick amplitude and length for a write element, and to determine, based on information from the read elements, the amount of overwrite actually being implemented by the write elements. In determining the amount of overwrite actually established, the data channels function in accordance with principles known in the art for determining overwrite.

By "kick amplitude" is meant the amount of write current overshoot from a baseline value. Accordingly, as set forth further below both the baseline value of the write current and/or the kick amplitude (overshoot from baseline write current) can be independently varied by the HDD controller 12 as it controls the electronics 16.

FIG. 1 also shows that each disk 20 may include plural portions 22. In one implementation, the portions 22 are established by disk sectors and/or disk zones.

Now referring to FIG. 2, the logic for establishing the presently preferred microcode lookup tables can be seen. Commencing at block 24, a baseline ambient temperature is established. This can be done by simply measuring the ambient temperature of the environment in which the HDD 10 is located during the logic of FIG. 2. In one embodiment the baseline ambient temperature may be 33° C.

Moving to block 26, for each head 18 and disk portion 22 that can be written by the head 18 under test, the following logic is executed. At block 28, one or both of the baseline write current, and/or the kick amplitude (and, if desired, kick duration) of the write element of the head 18 under test is established to achieve a desired overwrite, as indicated by feedback from the associated read element of the head 18 under test and related data channel in the electronics 16. In one non-limiting illustrative embodiment, the desired overwrite may be between −22 db and −24 db, more preferably between −22 db and −23.5 db, and more preferably still may be −23 db. The write current and/or kick amplitude and/or duration are stored in a table that correlates these values with the head 18 and disk portion under test.

Once the write current value and/or kick amplitude/duration values for the head 18 under test are established and recorded as set forth above, the process is repeated for the next disk portion 22 that may be written by the head 18 under test. This results in another microcode table entry. Upon completion of testing all disk portions, the next head 18 is likewise processed for each related disk portion 22, until all heads have been processed and construction of the microcode table completed.

FIG. 3 shows the operating logic that can be executed by the HDD controller 12. Commencing at block 32, when a write to particular disk portion 22 is to be undertaken by an associated head 18, the write current and/or kick amplitude/duration values for that portion 22/head 18 combination are retrieved from the table constructed above, using the head 18/disk portion 22 as entering argument.

As recognized herein, the actual overwrite achieved for a given write current can vary with temperature-induced variations in fly height and disk coercivity. Accordingly, proceeding to block 34, in an exemplary implementation the actual temperature is read by the HDD controller 12 using the temperature sensor 15. Actual temperature may be periodically read, e.g., every eight disk revolutions.

Moving to block 36, the looked-up values for write current and/or kick amplitude are dynamically adjusted for actual temperature variations from the baseline ambient temperature at which the table values were established. In one exemplary non-limiting embodiment, this may done using the algorithm:

$$\text{value to be used} = \text{value in table} + 0.34(\text{baseline ambient temperature} - \text{actual } T),$$

wherein actual T=temperature as indicated by the sensor 15, and wherein baseline ambient temperature can be 33° C.

At block 38, the adjusted values ("value to be used" in the equation above) of write current and/or kick amplitude are applied to the head 18 that is to do the writing.

In another embodiment, the slope of the above equation may be modified depending on the actual temperature. For example, one slope can be used when temperature is above a threshold and another when temperature is below the threshold, as follows:

For Actual Temp.≧threshold (of, e.g., 33° C.):

$$\text{value to be used} = \text{value in table} + k_h(\text{baseline ambient temperature} - \text{actual } T),$$

wherein actual T=temperature as indicated by the sensor 15, wherein baseline ambient temperature can be 33° C., and wherein $k_h$ is used when actual temperature is greater than or equal to the threshold temperature;

For Actual Temp.<threshold (of, e.g., 33° C.):

$$\text{value to be used} = \text{value in table} + k_c(\text{baseline ambient temperature} - \text{actual } T),$$

wherein actual T=temperature as indicated by the sensor 15, wherein baseline ambient temperature can be 33° C., and wherein $k_c$ is used when actual temperature is less than the threshold temperature.

While the particular SYSTEM AND METHOD FOR CONTROLLING WRITE TO MINIMIZE ATI AND SQUEEZE EFFECTS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

I claim:

1. A hard disk drive (HDD), comprising:
   at least one disk including plural disk portions;
   at least one write element juxtaposed with the disk for writing data in at least some disk portions; and
   a controller establishing at least one of: a write current, or a kick amplitude, the write current and/or kick amplitude being associated with the write element for each head for each disk portion to establish an overwrite signal-to-noise ratio to be within a predetermined desired range.

2. The HDD of claim 1, wherein the controller establishes both a write current and a kick amplitude for each write element for each portion.

3. The HDD of claim 1, wherein the desired range is approximately −22 db to −24 db.

4. The HDD of claim 1, wherein the controller accesses a table correlating write current and kick amplitude to head/portion combinations.

5. The HDD of claim 4, wherein the controller dynamically varies looked-up write currents and kick amplitudes.

6. The HDD of claim 5, wherein the write current and kick amplitudes are varied as a function of sensed temperature.

7. A chip for a hard disk drive (HDD) having at least one disk defining plural disk portions and at least one write element for writing data to the disk, comprising:
   logic means for accessing a table correlating at least one write parameter to head/disk portion combinations; and
   logic means for establishing, for at least one head/disk portion combination, a write current and a kick amplitude, wherein kick amplitude and write current establish an overwrite signal-to-noise ratio within a desired range.

8. The chip of claim 7, wherein the table correlates two write parameters to each head/portion combination.

9. The chip of claim 7, comprising means for dynamically varying looked-up write currents and kick amplitudes.

10. The chip of claim 7, comprising means for dynamically varying looked-up write currents and kick amplitudes as a function of sensed temperature.

11. A chip for a HDD including at least one head and at least one disk juxtaposed with the head and defining plural disk portions, comprising:
   means for storing at least one value for each head for each disk portion which can be written to by the head, the at least one value representing baseline write current and/or kick amplitude; and
   means for using the value to generate a write current for the head, wherein the means for storing stores, for each head for each portion which can be operably associated with the head, a kick amplitude value and a baseline write current value, wherein the means for varying both values.

12. The chip of claim 11, wherein the HDD includes at least one temperature sensor, and the controller chip further comprises:
   means for varying the value based on a signal from the temperature sensor to establish a temperature-corrected value; and
   means for applying a signal characterized by the temperature-corrected value to the head.

13. A logic element for a hard disk drive (HDD) having at least one disk defining plural disk portions and at least one write element for writing data to the disk, the logic element holding logic embodying method acts comprising:
   accessing a table correlating write currents and kick amplitudes to head/disk portion combinations; and
   establishing, for at least one head/disk portion combination, at least one of: a write current and/or a kick amplitude, wherein the write current and/or kick amplitudes are varied using an equation having a slope value, the slope value being a first value when temperature is above a threshold, the slope value being a second value when temperature is below the threshold.

14. The logic element of claim 13, wherein the logic establishes both of a write current and a kick amplitude for each head/portion combination.

15. The logic element of claim 14, wherein the kick amplitude and write current establish an overwrite signal-to-noise ratio within a desired range.

16. The logic element of claim 14, wherein the logic comprises dynamically varying looked-up write currents and kick amplitudes.

17. The logic element of claim 14, wherein the logic comprises means for dynamically varying looked-up write currents and kick amplitudes as a function of sensed temperature.

18. The HDD of claim 6, wherein the write current and kick amplitudes are varied using an equation having a slope value, the slope value being a first value when temperature is above a threshold, the slope value being a second value when temperature is below the threshold.

19. The chip of claim 10, wherein the write current and kick amplitudes are varied using an equation having a slope value, the slope value being a first value when temperature is above a threshold, the slope value being a second value when temperature is below the threshold.

20. The chip of claim 18, wherein the write current and kick amplitudes are varied using an equation having a slope value, the slope value being a first value when temperature is above a threshold, the slope value being a second value when temperature is below the threshold.

* * * * *